United States Patent
Ota (10) Patent No.: US 9,856,771 B2
(45) Date of Patent: Jan. 2, 2018

(54) EXHAUST GAS CONTROL APPARATUS FOR INTERNAL COMBUSTION ENGINE

(71) Applicant: TOYOTA JIDOSHA KABUSHIKI KAISHA, Toyota-Shi, Aichi-Ken (JP)

(72) Inventor: Hirohiko Ota, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/077,137

(22) Filed: Mar. 22, 2016

(65) Prior Publication Data
US 2016/0281567 A1 Sep. 29, 2016

(30) Foreign Application Priority Data
Mar. 26, 2015 (JP) ................................. 2015-064498

(51) Int. Cl.
*F01N 3/00* (2006.01)
*F01N 3/20* (2006.01)
*F01N 9/00* (2006.01)

(52) U.S. Cl.
CPC .......... *F01N 3/208* (2013.01); *F01N 3/2006* (2013.01); *F01N 9/00* (2013.01); *F01N 2610/02* (2013.01); *F01N 2610/146* (2013.01); *F01N 2900/1402* (2013.01); *F01N 2900/1602* (2013.01); *F01N 2900/1622* (2013.01); *Y02T 10/24* (2013.01); *Y02T 10/47* (2013.01)

(58) Field of Classification Search
USPC ............... 60/276, 286, 295, 297, 301, 303
See application file for complete search history.

(56) References Cited

U.S. PATENT DOCUMENTS

| 8,540,953 | B2 * | 9/2013 | Toshioka | ............... B01D 53/90 422/105 |
| 8,578,705 | B2 * | 11/2013 | Sindano | .................. F01N 3/208 60/295 |
| 8,826,644 | B2 * | 9/2014 | Ponnathpur | ........... F01N 3/2066 60/274 |
| 8,863,503 | B2 * | 10/2014 | Yasui | ........................ F01N 3/10 60/274 |

(Continued)

FOREIGN PATENT DOCUMENTS

JP 2009-281350 A 12/2009
JP 2014-088800 A 5/2014

*Primary Examiner* — Binh Q Tran
(74) *Attorney, Agent, or Firm* — Oliff PLC (57) ABSTRACT

An exhaust gas control apparatus for an internal combustion engine includes a urea water injection valve, a catalyst disposed in an exhaust passage downstream of the injection valve, and an electronic control unit. The injection valve is configured to add urea water to exhaust gas. The catalyst is configured to adsorb ammonia generated from the urea water. The electronic control unit is configured to (i) set a target adsorption amount of the ammonia adsorbed on the catalyst, (ii) control the injection valve such that the amount of the urea water added to the exhaust gas becomes an addition amount calculated based on the target adsorption amount, and (iii) execute an initialization processing for decreasing the amount of the ammonia adsorbed on the catalyst to (zero) when an integrated value of the amount of the NOx flowing into the catalyst is equal to or higher than a predetermined value.

9 Claims, 5 Drawing Sheets (56) References Cited

U.S. PATENT DOCUMENTS

| | | | |
|---|---|---|---|
| 8,893,475 B2* | 11/2014 | Geveci | F01N 3/208 60/274 |
| 8,899,024 B2* | 12/2014 | Masaki | F01N 3/208 60/286 |
| 2009/0288397 A1 | 11/2009 | Shimomura et al. | |
| 2009/0293459 A1 | 12/2009 | Shimomura et al. | |
| 2011/0311420 A1 | 12/2011 | Perrin et al. | |
| 2015/0231569 A1 | 8/2015 | Takayanagi | |

* cited by examiner

EXHAUST GAS CONTROL APPARATUS FOR INTERNAL COMBUSTION ENGINE

INCORPORATION BY REFERENCE

The disclosure of Japanese Patent Application No. 2015-064498 filed on Mar. 26, 2015 including the specification, drawings and abstract is incorporated herein by reference in its entirety.

BACKGROUND

1. Technical Field

The disclosure relates to an exhaust gas control apparatus for an internal combustion engine.

2. Description of Related Art

An internal combustion engine that is provided with a catalyst which purifies exhaust gas of nitrogen oxide (NOx) is known (for example, refer to Japanese Patent Application Publication No. 2014-88800 (JP 2014-88800 A)). An adding mechanism that adds urea water to the exhaust gas is disposed in an exhaust passage of the internal combustion engine, and ammonia generated from the urea water is adsorbed onto the NOx-removing catalyst. Then, the NOx is removed by reduction by the ammonia adsorbed on the catalyst.

When an insufficient amount of the ammonia is adsorbed on the catalyst, the NOx removal cannot be appropriately performed. An excessive ammonia adsorption amount, meanwhile, is likely to result in a phenomenon known as "ammonia slip." Accordingly, it is desirable to set a target adsorption amount for the ammonia adsorbed onto the catalyst and to execute an ammonia adsorption amount control for controlling the amount of the urea water addition based on the target adsorption amount.

Regarding the execution of the ammonia adsorption amount control, it is important to suppress an error between the target adsorption amount and an actual ammonia adsorption amount. However, ammonia desorption and adsorption are repeated in the catalyst as a result of the NOx removal, and this causes the actual ammonia adsorption amount to deviate from the target adsorption amount. Such deviation causes the error (i.e., the difference between the target and actual ammonia adsorption amounts) to accumulate.

In the device disclosed in JP 2014-88800 A or the like, an initialization processing is performed in this regard when the deviation between an estimated value of the ammonia adsorption amount and the actual ammonia adsorption amount is equal to or higher than a predetermined value. This initialization processing causes the ammonia to be fully desorbed from the catalyst by executing a process of raising a temperature of the exhaust gas to cause a temperature of the catalyst to rise. When the initialization processing is performed, the accumulated error is eliminated, and thus the deviation of the actual ammonia adsorption amount with respect to the target adsorption amount can be suppressed during the subsequent ammonia adsorption amount control.

SUMMARY

In the device that is disclosed in JP 2014-88800 A, however, the above-described deviation might not be accurately calculated when the estimated value of the ammonia adsorption amount itself has an error. In this case, an erroneous calculation of the deviation might lead to a continuous state where the deviation remains below the predetermined value. Then, a state where the initialization processing is not executed continues, and the actual error might increase.

The embodiments provide an exhaust gas control apparatus for an internal combustion engine that is capable of suppressing an increase in an error of an actual ammonia adsorption amount with respect to a target adsorption amount which is attributable to a continuation of a state where an initialization processing is not executed.

An exhaust gas control apparatus for an internal combustion engine according to an aspect includes a urea water injection valve, a catalyst disposed in an exhaust passage downstream of the urea water injection valve, and an electronic control unit. The urea water injection valve is configured to add urea water to exhaust gas in the exhaust passage of the internal combustion engine. The catalyst is configured to adsorb ammonia generated from the urea water. The catalyst also is configured to remove NOx from the exhaust gas by using the ammonia which has been adsorbed on the catalyst. The electronic control unit is configured to set a target adsorption amount of the ammonia adsorbed on the catalyst. The electronic control unit also is configured to control the urea water injection valve such that an amount of the urea water added to the exhaust gas becomes an addition amount calculated based on the target adsorption amount. The electronic control unit further is configured to execute an initialization processing that decreases the amount of the ammonia adsorbed on the catalyst to "0" (zero) in a case where an integrated value of an amount of the NOx flowing into the catalyst is equal to or higher than a predetermined value.

The number of ammonia-NOx reactions in the catalyst increases as the integrated value of the amount of the NOx flowing into the catalyst increases, and thus a cumulative value of an error between the target ammonia adsorption amount and an actual ammonia adsorption amount increases. In the above-described aspect, however, the initialization processing is executed on a condition that (when) the integrated value of the amount of the NOx flowing into the catalyst is equal to or higher than the predetermined value, and thus the initialization processing can be reliably executed based on the integrated value of the NOx amount. Accordingly, an increase in the error of the actual ammonia adsorption amount with respect to the target adsorption amount attributable to a continuation of a state where the initialization processing is not executed can be suppressed.

In the exhaust gas control apparatus according to the aspect described above, the electronic control unit may be configured to execute the initialization processing by executing a temperature-raising processing that raises a temperature of the exhaust gas flowing into the catalyst. According to this aspect, a temperature of the catalyst is raised by the temperature-raising processing, and thus desorption of the ammonia from the catalyst is prompted. Accordingly, the amount of the ammonia adsorbed on the catalyst can be decreased to "0" (zero).

In the exhaust gas control apparatus according to the aspect described above, the electronic control unit may be configured to execute the temperature-raising processing by raising the temperature of the exhaust gas to a temperature at which the ammonia is desorbed from the catalyst.

In the exhaust gas control apparatus according to the aspect described above, the electronic control unit may be configured to execute the initialization processing by stopping the adding of the urea water by the urea water injection valve. According to this aspect, the adding of the urea water is stopped, and thus a reduction processing for the NOx flowing into the catalyst is performed by the ammonia previously adsorbed on the catalyst before the urea water addition was stopped. Accordingly, the ammonia previously adsorbed on the catalyst is consumed through a reduction reaction with the NOx, and the ammonia adsorption amount of the catalyst gradually decreases. Accordingly, the amount of the ammonia adsorbed on the catalyst ultimately is decreased to "0" (zero) in the end.

In the exhaust gas control apparatus according to the aspect described above, the electronic control unit may be configured to measure an execution time of the initialization processing. The electronic control unit may be configured to execute the initialization processing until the measured execution time reaches a predetermined threshold.

According to this aspect, the initialization processing can be executed until the amount of the ammonia adsorbed on the catalyst becomes "0" (zero) by the threshold of the execution time being appropriately set.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
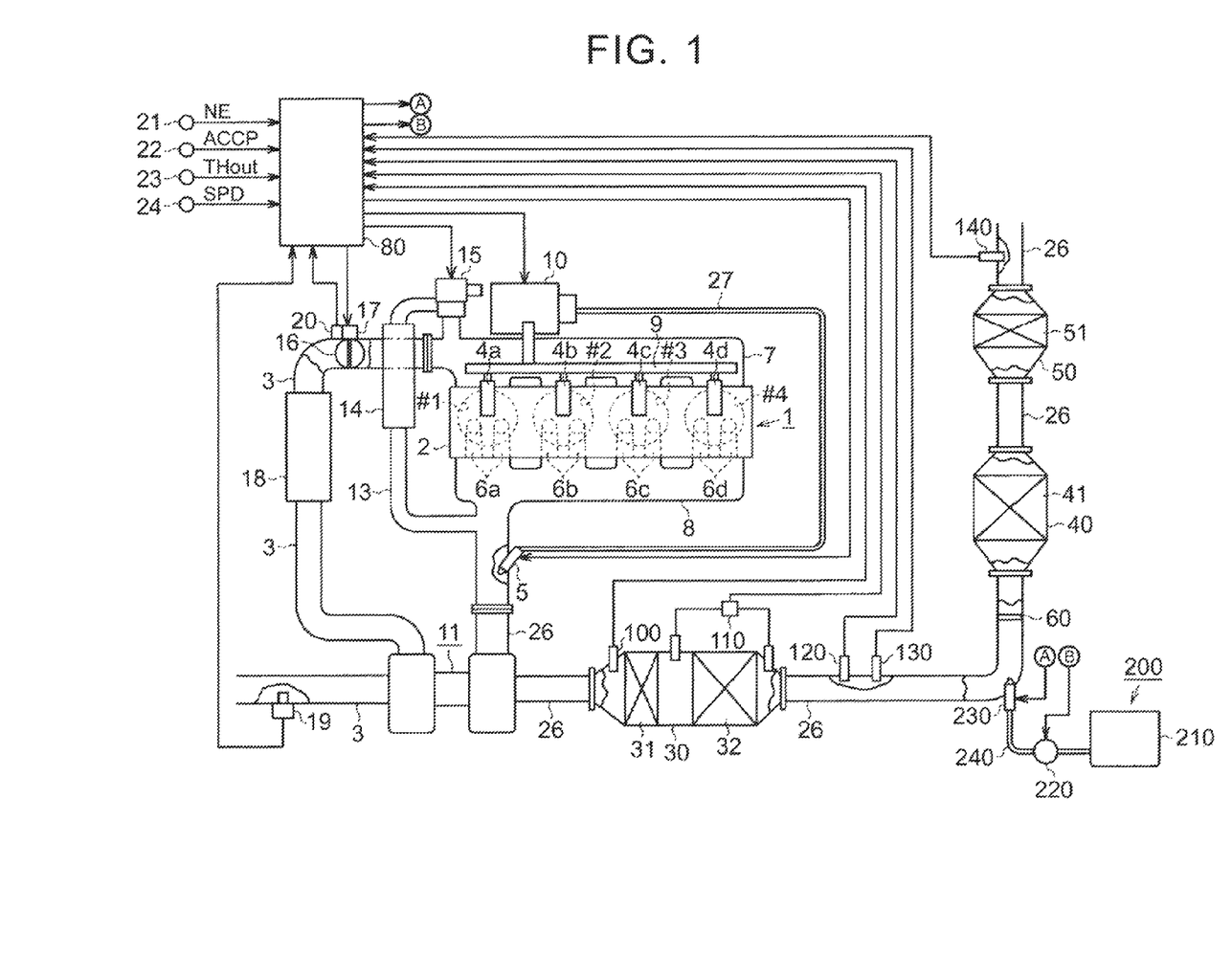
FIG. 1 is a schematic drawing illustrating an internal combustion engine to which an embodiment of an exhaust gas control apparatus for an internal combustion engine is applied and a peripheral configuration thereof.

Hereinafter, a specific embodiment of an exhaust gas control apparatus for an internal combustion engine will be described with reference to FIGS. 1 to 5. FIG. 1 shows a diesel engine (hereinafter, simply referred to as an "engine") to which the exhaust gas control apparatus according to this embodiment is applied and a peripheral configuration thereof.

A plurality of cylinders #1 to #4 are disposed in an engine 1. In a cylinder head 2, a plurality of fuel injection valves 4a to 4d are disposed in correlation with the respective cylinders #1 to #4. The fuel injection valves 4a to 4d inject a fuel to combustion chambers of the respective cylinders #1 to #4. In the cylinder head 2, an intake port for introducing fresh air into the cylinders and exhaust ports 6a to 6d for discharging combustion gas out of the cylinders are also disposed in correlation with the respective cylinders #1 to #4.

The fuel injection valves 4a to 4d are connected to a common rail 9 that accumulates a high-pressure fuel. The common rail 9 is connected to a supply pump 10. The supply pump 10 suctions the fuel in a fuel tank and supplies the high-pressure fuel to the common rail 9. The high-pressure fuel that is supplied to the common rail 9 is injected into the cylinders from the fuel injection valves 4a to 4d when the respective fuel injection valves 4a to 4d are open.

An intake manifold 7 is connected to the intake port. The intake manifold 7 is connected to an intake passage 3. An intake throttle valve 16 for adjusting the amount of suctioned air is disposed in the intake passage 3.

An exhaust manifold 8 is connected to the exhaust ports 6a to 6d. The exhaust manifold 8 is connected to an exhaust passage 26. A turbocharger 11 that turbocharges the suctioned air which is introduced to the cylinders by using exhaust pressure is disposed in the middle of the exhaust passage 26. In the intake passage 3, an intercooler 18 is disposed between an intake side compressor of the turbocharger 11 and the intake throttle valve 16. The intercooler 18 cools the suctioned air after the turbocharger 11 raises the temperature of the suctioned air by turbocharging.

A first purifying member 30 that purifies exhaust gas is disposed in the middle of the exhaust passage 26 and on the downstream side of an exhaust side turbine of the turbocharger 11. In the first purifying member 30, an oxidation catalyst 31 and a filter 32 are arranged in series with respect to the direction in which the exhaust gas flows.

A catalyst that performs oxidation processing on the HC in the exhaust gas is supported in the oxidation catalyst 31. The filter 32 is a member that collects the particulate matter (PM) in the exhaust gas and is formed of porous ceramic. A catalyst for promoting the oxidation of the PM is supported in the filter 32. The PM in the exhaust gas is collected during passage through a porous wall of the filter 32.

A fuel adding valve 5 for adding the fuel to the exhaust gas is disposed in the vicinity of a merging portion of the exhaust manifold 8. The fuel adding valve 5 is connected to the supply pump 10 via a fuel supply pipe 27. The arrangement position of the fuel adding valve 5 can be appropriately changed as long as the arrangement position of the fuel adding valve 5 is on the upstream side of the first purifying member 30 in an exhaust system. The fuel also may be added to the exhaust gas by post injection being performed by injectors 4a-4d with a fuel injection timing adjusted.

When the amount of the PM collected by the filter 32 exceeds a predetermined value, a regeneration processing for the filter 32 is initiated and the fuel is injected into the exhaust manifold 8 from the fuel adding valve 5. This fuel injected from the fuel adding valve 5 is oxidized when reaching the oxidation catalyst 31. Then, the temperature of the exhaust gas rises. Then, the temperature of the filter 32 is raised by the exhaust gas, the temperature of which is raised by the oxidation catalyst 31, flowing into the filter 32. This causes the filter 32 to be regenerated with the PM deposited in the filter 32 subjected to the oxidation processing.

A second purifying member 40 that purifies the exhaust gas is disposed in the middle of the exhaust passage 26 and on the downstream side of the first purifying member 30. A selective reduction-type NOx catalyst (hereinafter, referred to as an SCR catalyst) 41 that reduction-purifies the exhaust gas of NOx by using ammonia is arranged in the second purifying member 40.

A third purifying member 50 that purifies the exhaust gas is disposed in the middle of the exhaust passage 26 and on the downstream side of the second purifying member 40. An ammonia oxidation catalyst 51 that purifies the exhaust gas of ammonia is arranged in the third purifying member 50.

A urea water supply mechanism 200 is disposed in the engine 1 as an adding mechanism that adds urea water to the exhaust gas. A tank 210 that stores the urea water, a urea adding valve 230 that supplies the urea water into the exhaust passage 26 by injection, a supply passage 240 that connects the urea adding valve 230 and the tank 210 to each other, and a pump 220 that is disposed in the middle of the supply passage 240 constitute the urea water supply mechanism 200.

The urea adding valve 230 is disposed between the first purifying member 30 and the second purifying member 40 in the exhaust passage 26. When the urea adding valve 230 is open, the urea water is injection-supplied into the exhaust passage 26 via the supply passage 240.

The pump 220 is an electric pump. During a positive rotation, the pump 220 feeds the urea water from the tank 210 toward the urea adding valve 230. During a reverse rotation, the pump 220 feeds the urea water from the urea adding valve 230 toward the tank 210. In other words, the urea water is recovered from the urea adding valve 230 and the supply passage 240 and is returned to the tank 210 during the reverse rotation of the pump 220.

In the exhaust passage 26, a dispersion plate 60 is disposed between the urea adding valve 230 and the SCR catalyst 41. The dispersion plate 60 promotes the atomization of the urea water by dispersing the urea water injected from the urea adding valve 230.

The urea water that is injected from the urea adding valve 230 is hydrolyzed by the heat of the exhaust gas and becomes ammonia. This ammonia is adsorbed onto the SCR catalyst 41 when reaching the SCR catalyst 41. The exhaust gas is reduction-purified of the NOx by the ammonia that is adsorbed onto the SCR catalyst 41.

Figure 2:
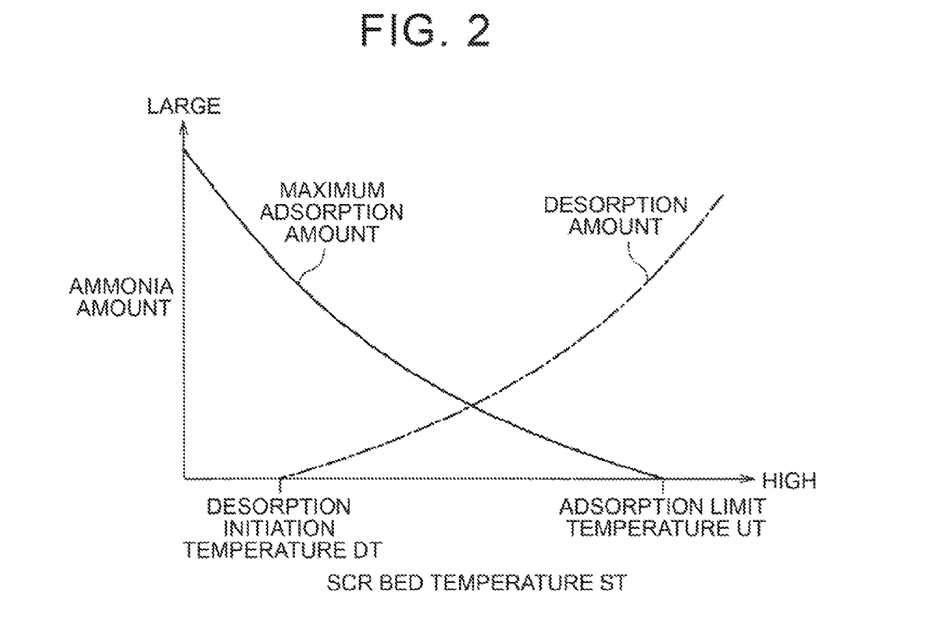
FIG. 2 is a graph illustrating a relationship of a maximum ammonia adsorption amount and an ammonia desorption amount to a catalyst temperature.

As illustrated in FIG. 2, the maximum adsorption amount of the ammonia that can be adsorbed onto the SCR catalyst 41 decreases as an SCR bed temperature ST, which is the temperature of the SCR catalyst 41, increases. When the SCR bed temperature ST exceeds an adsorption limit temperature UT, the ammonia cannot be adsorbed onto the SCR catalyst 41. When the SCR bed temperature ST exceeds a desorption initiation temperature DT, the ammonia begins to be desorbed from the SCR catalyst 41. This desorption initiation temperature DT is a temperature that is lower than the adsorption limit temperature UT. The amount of the ammonia that is desorbed from the SCR catalyst 41 increases as the SCR bed temperature ST increases. Accordingly, the maximum ammonia adsorption amount decreases and the ammonia desorption amount increases as the SCR bed temperature ST increases as a result of a rise in the exhaust gas temperature.

The engine 1 is also provided with an exhaust gas recirculation device (hereinafter, referred to as an EGR device). An EGR passage 13 that allows the intake manifold 7 and the exhaust manifold 8 to communicate with each other, an EGR valve 15 that is disposed in the EGR passage 13, an EGR cooler 14 that is disposed in the middle of the EGR passage 13, and the like constitute this EGR device. An EGR amount is adjusted when the opening degree of the EGR valve 15 is adjusted in accordance with an engine operation state. The EGR amount is the amount of the exhaust gas returning from the exhaust passage 26 to the intake passage. The temperature of the exhaust gas that flows through the EGR passage 13 is lowered by the EGR cooler 14.

Various sensors are attached to the engine 1 so as to detect the engine operation states. For example, an air flow meter 19 detects the suctioned air amount GA, a throttle valve opening degree sensor 20 detects the opening degree of the intake throttle valve 16, a crank angle sensor 21 detects an engine rotation speed NE, an accelerator sensor 22 detects an accelerator pedal depression amount, that is, an accelerator operation amount ACCP, an outside air temperature sensor 23 detects an outside air temperature THout, and a vehicle speed sensor 24 detects a vehicle speed SPD of a vehicle in which the engine 1 is mounted.

A first exhaust gas temperature sensor 100, which is disposed on the upstream side of the oxidation catalyst 31, detects a first exhaust gas temperature TH1 that is the temperature of the exhaust gas prior to the inflow into the oxidation catalyst 31. A differential pressure sensor 110 detects the pressure difference AP between the exhaust pressures on the upstream and downstream sides of the filter 32.

In the exhaust passage 26, a second exhaust gas temperature sensor 120 and a first NOx sensor 130 are disposed between the first purifying member 30 and the second purifying member 40 and on the upstream side of the urea adding valve 230. The second exhaust gas temperature sensor 120 detects a second exhaust gas temperature TH2 that is the temperature of the exhaust gas prior to the inflow into the SCR catalyst 41. This second exhaust gas temperature TH2 is more suitable than the first exhaust gas temperature TH1 as representing a temperature that has a correlation with the temperature of the SCR catalyst 41. The first NOx sensor 130 detects a first NOx concentration N1 that is the NOx concentration of the exhaust gas prior to the inflow into the SCR catalyst 41.

In the exhaust passage 26, a second NOx sensor 140 is disposed on the downstream side of the third purifying member 50. The second NOx sensor 140 detects a second NOx concentration N2 that is the NOx concentration of the exhaust gas purified by the SCR catalyst 41.

Outputs of these sensors or the like are input to an electronic control unit 80. The main component of this electronic control unit 80 is a microcomputer that is provided with, for example, a central processing unit (CPU), a read-only memory (ROM) where various programs, maps, and the like are stored in advance, a random access memory (RAM) that temporarily stores calculation results of the CPU and the like, a timer counter, an input interface, and an output interface.

Various types of control for the engine 1 are performed by the electronic control unit 80. Examples thereof include fuel injection quantity control and injection timing control regarding the fuel injection valves 4a to 4d and the fuel adding valve 5, discharge pressure control regarding the supply pump 10, drive amount control regarding an actuator 17 that opens or closes the intake throttle valve 16, and opening degree control regarding the EGR valve 15.

The electronic control unit 80 also performs various types of exhaust gas purification control, examples of which include the regeneration processing for the combustion of the PM collected by the filter 32. The electronic control unit 80 controls the urea water addition by the urea adding valve 230 as an example of the exhaust gas purification control. In this addition control, a urea addition amount QE that is required for the reduction processing of the NOx discharged from the engine 1 is calculated based on the engine operation states and the like. Then, the open state of the urea adding valve 230 is controlled so that the amount of the urea water equivalent to the calculated urea addition amount QE is injected from the urea adding valve 230. In addition, the electronic control unit 80 executes ammonia adsorption amount control for controlling the ammonia adsorption amount of the SCR catalyst 41 as one aspect of this addition control.

Figure 3:
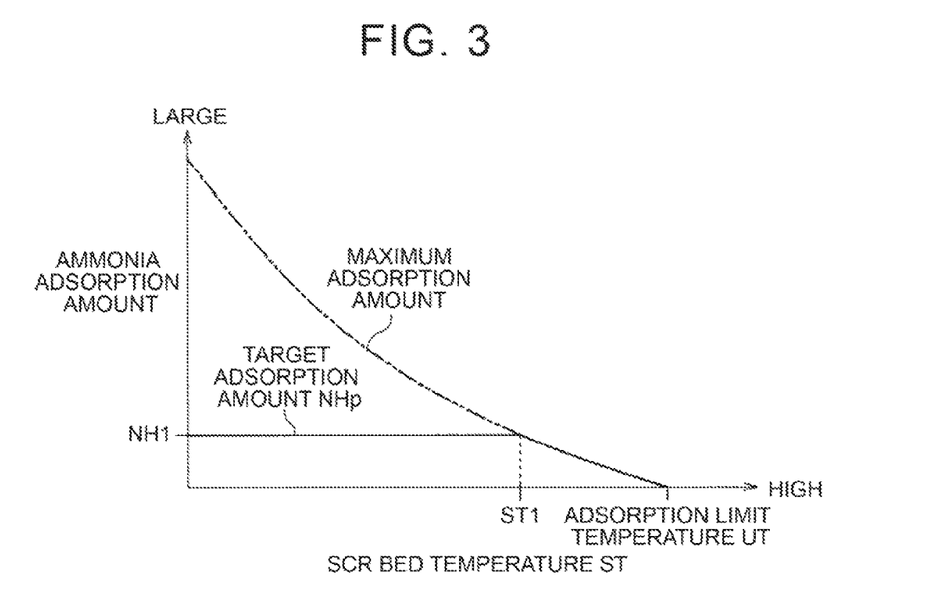
FIG. 3 is a graph illustrating a relationship between the catalyst temperature and a target adsorption amount.

As illustrated in FIG. 3, a target adsorption amount NHp of the ammonia that is required for the NOx reduction processing in the SCR catalyst 41 is set during this ammonia adsorption amount control. In this embodiment, a constant and fixed value NH1 is set as the target adsorption amount NHp in a case where the SCR bed temperature ST is equal to or lower than a predetermined temperature ST1. In a region where the SCR bed temperature ST exceeds the temperature ST1, an amount that is smaller than the fixed value NH1 is set as the target adsorption amount NHp. More specifically, the target adsorption amount NHp is variably set to decrease as the SCR bed temperature ST increases. A correction of the urea addition amount QE based on the target adsorption amount NHp allows the ammonia adsorption amount to be controlled so that the actual ammonia adsorption amount of the SCR catalyst 41 (hereinafter, referred to as an actual adsorption amount) and the target adsorption amount NHp correspond to each other.

As described above, the ammonia desorption and adsorption are repeated in the SCR catalyst 41 as a result of the NOx purification in the SCR catalyst 41. Accordingly, the actual adsorption amount NHR deviates from the target adsorption amount NHp and an error of the actual adsorption amount NHR with respect to the target adsorption amount is accumulated.

Figure 4:
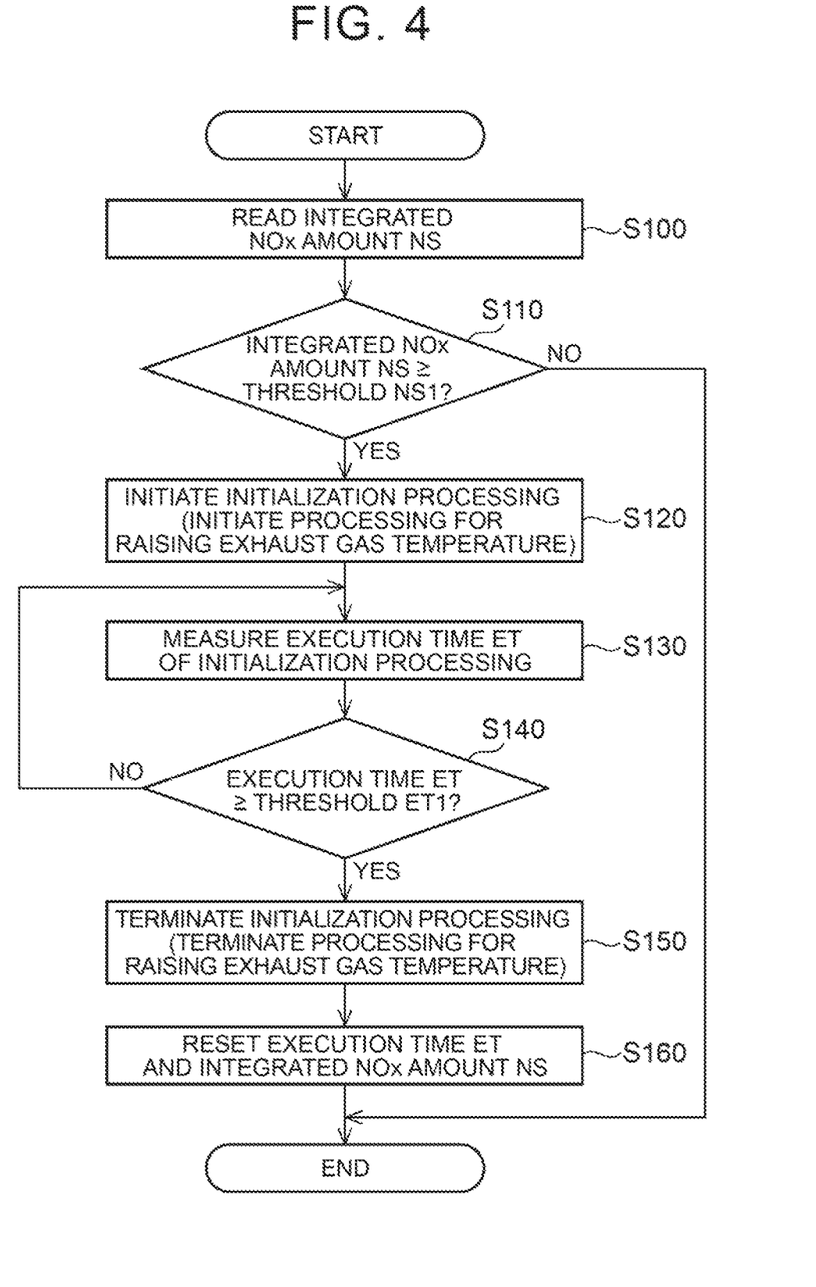
FIG. 4 is a flowchart illustrating a series of processing procedures pertaining to an execution of an initialization processing according to this embodiment.

In this regard, the electronic control unit 80 suppresses an increase in the error by performing the processing illustrated in FIG. 4. As illustrated in FIG. 4, the electronic control unit 80 reads an integrated NOx amount NS first (S100). The integrated NOx amount NS is an integrated value of the amount of the NOx flowing into the SCR catalyst 41 and is obtained by time-integrating a value which is detected by the first NOx sensor 130. This integrated NOx amount NS is calculated through a processing separate from the FIG. 4 processing. In addition, the integrated NOx amount NS is reset to "0" (zero) and an integration processing starts anew at a point in time when an initialization processing (described later) is terminated and at a point in time when the regeneration processing for the filter 32 is terminated.

Then, the electronic control unit 80 determines whether or not the integrated NOx amount NS is equal to or larger than a threshold NS1 (S110). The number of ammonia-NOx reactions in the SCR catalyst 41 increases as the integrated NOx amount NS increases, and thus the ammonia desorption and adsorption are repeated a number of times in the SCR catalyst 41. Accordingly, it is conceivable that the cumulative value of the error of the actual adsorption amount NHR with respect to the target adsorption amount NHp increases as the integrated NOx amount NS increases. A value of the integrated NOx amount NS with which it can be determined that the cumulative value of the error of the actual adsorption amount NHR with respect to the target adsorption amount NHp is increased to an unacceptable degree is set as the threshold NS 1 in advance through an experiment or the like.

When the integrated NOx amount NS is smaller than the threshold NS 1 (S110: NO), the cumulative value of the error of the actual adsorption amount NHR with respect to the target adsorption amount NHp is not significantly high. Accordingly, the electronic control unit 80 temporarily terminates this processing.

When the integrated NOx amount NS is equal to or larger than the threshold NS1 (S110: YES), the cumulative value of the error of the actual adsorption amount NHR with respect to the target adsorption amount NHp is high to an unacceptable degree. Accordingly, the electronic control unit 80 initiates the initialization processing for decreasing the amount of the ammonia adsorbed on the SCR catalyst 41 to "0" (S120).

In this embodiment, a temperature-raising processing for raising the temperature of the exhaust gas flowing into the SCR catalyst 41 is executed as the initialization processing. This temperature-raising processing can be appropriately executed. For example, the temperature of the exhaust gas can be raised by the fuel addition from the fuel adding valve 5 being executed or by the post injection being executed. During the execution of this temperature-raising processing, the temperature of the exhaust gas is raised up to a temperature at which the ammonia is desorbed from the SCR catalyst 41. More specifically, the temperature of the exhaust gas is raised to at least a temperature at which the amount of the ammonia desorbed from the SCR catalyst 41 exceeds the amount of the ammonia adsorbed on the SCR catalyst 41. In this embodiment, for example, the temperature of the exhaust gas is raised up to the adsorption limit temperature UT at which the ammonia adsorption on the SCR catalyst 41 becomes impossible. As the initialization processing, the regeneration processing for the filter 32 may be forced to be initiated.

After the initiation of the initialization processing, the electronic control unit 80 measures an execution time ET of the initialization processing (S130). The execution time ET represents the length of time from the initiation of the initialization processing.

Then, the electronic control unit 80 determines whether or not the execution time ET is equal to or longer than a threshold ET1 (S140). As the threshold ET1, the execution time ET is set in advance that is required for the ammonia adsorbed on the SCR catalyst 41 to be fully desorbed.

When the execution time ET is shorter than the threshold ET1 (S140: NO), the electronic control unit 80 repeatedly performs the processing of Step S130 and the processing of Step S140 until the execution time ET becomes equal to or longer than the threshold ET1.

Once the execution time ET becomes equal to or longer than the threshold ET1, the electronic control unit 80 terminates the initialization processing. In other words, the temperature-raising processing for the exhaust gas is terminated (S150) and the execution time ET and the integrated NOx amount NS are reset to "0" (S160). Then, the electronic control unit 80 temporarily terminates this processing.

Hereinafter, an effect of this embodiment will be described with reference to FIG. 5. Once the integrated NOx amount NS becomes equal to or larger than the threshold NS1 at time t1, the SCR bed temperature ST gradually increases by the initialization processing being initiated. This rise in the SCR bed temperature ST prompts the desorption of the ammonia from the SCR catalyst 41, and thus the actual adsorption amount NHR gradually decreases and reaches "0" in the end as illustrated by the solid line L1.

As illustrated by the two-dot chain line L2, the rise in the SCR bed temperature ST causes the target adsorption amount NHp to gradually decrease. Once the SCR bed temperature ST reaches the adsorption limit temperature UT at time t2, the ammonia adsorption becomes impossible, and thus the target adsorption amount NHp is set to "0". The urea addition amount gradually decreases as well due to this decrease in the target adsorption amount NHp resulting from the rise in the SCR bed temperature ST. Once the target adsorption amount NHp is set to "0" at time t2, the urea addition amount for the ammonia adsorption is set to "0".

Once the execution time ET reaches the threshold ET1 at time t3, the initialization processing is terminated and the SCR bed temperature ST decreases. After time t3, the urea addition-based ammonia adsorption amount control is initiated. In other words, the target adsorption amount NHp is set based on the SCR bed temperature ST and the urea addition for ammonia adsorption is initiated, allowing the actual adsorption amount NHR to begin to increase again.

Since the initialization processing is executed prior to the initiation of the ammonia adsorption amount control at time t3, the actual adsorption amount NHR is temporarily reset to "0". Accordingly, a cumulative error AG of the actual adsorption amount NHR with respect to the target adsorption amount NHp that existed before the initiation of the execution of the initialization processing is eliminated. Accordingly, after time t3, the deviation of the actual adsorption amount NHR with respect to the target adsorption amount NHp remains suppressed, and the actual adsorption amount NHR of the SCR catalyst 41 is maintained at an appropriate amount in accordance with the target adsorption amount NHp.

Figure 5:
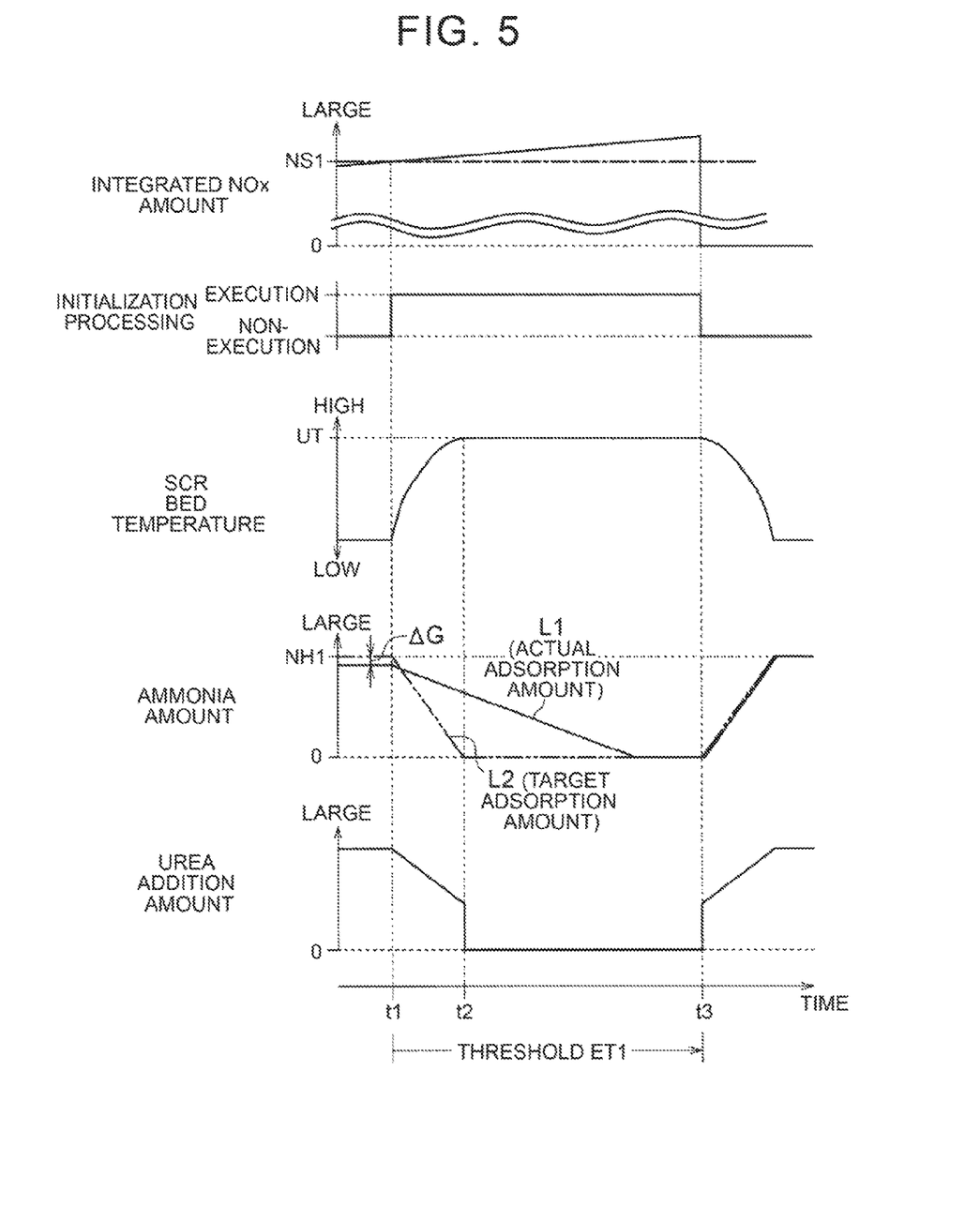
FIG. 5 is a timing chart illustrating an effect of the initialization processing according to this embodiment.

In FIG. 5, a state where the actual adsorption amount NHR is smaller than the target adsorption amount NHp prior to the execution of the initialization processing is shown as an example. However, an effect that is similar to the above-described effect is achieved by the execution of the initialization processing even in a state where the actual adsorption amount NHR is larger than the target adsorption amount NHp prior to the execution of the initialization processing.

The actual adsorption amount NHR is "0" immediately after the termination of the initialization processing, and thus it is desirable that the actual adsorption amount NHR is increased rapidly. To this end, immediately after the initiation of the ammonia adsorption amount control at time t3 in FIG. 5, the actual adsorption amount NHR may be increased rapidly by a relatively high value being set to the target adsorption amount NHp instead of the target adsorption amount NHp being set based on the SCR bed temperature ST.

The following effects can be achieved with this embodiment described above. (1) The initialization processing for decreasing the amount of the ammonia adsorbed on the SCR catalyst 41 to "0" is executed on the condition that the integrated value of the amount of the NOx flowing into the SCR catalyst 41 is equal to or larger than the threshold NS1. Accordingly, the initialization processing is reliably executed based on the integrated value of the NOx amount. Hence, an increase in the error of the actual adsorption amount NHR with respect to the target adsorption amount NHp that is attributable to the continuation of a state where the initialization processing is not executed can be suppressed.

(2) The temperature-raising processing for raising the temperature of the exhaust gas flowing into the SCR catalyst 41 is executed as the initialization processing described above. Accordingly, the amount of the ammonia adsorbed on the SCR catalyst 41 can be decreased to "0".

(3) The execution time ET of the initialization processing is measured and the initialization processing is executed until the measured execution time ET reaches the threshold ET1 determined in advance. Accordingly, the initialization processing can be executed until the amount of the ammonia adsorbed on the SCR catalyst 41 becomes "0" by the threshold ET1 being appropriately set.

The above-described embodiment can be modified as follows. In the embodiment described above, the constant and fixed value NH1 is set as the target adsorption amount NHp, as illustrated in FIG. 3, in a case where the SCR bed temperature ST is equal to or lower than the predetermined temperature ST1. However, the manner in which the target adsorption amount NHp is set can be appropriately changed. For example, the target adsorption amount NHp may be variably set in accordance with the SCR bed temperature ST even in a case where the SCR bed temperature ST is equal to or lower than the predetermined temperature ST1. In addition, the target adsorption amount NHp may be variably set based on the amount of the NOx flowing into the SCR catalyst 41 per unit time.

The integrated NOx amount NS is a value that is obtained by time-integrating a value which is detected by the first NOx sensor 130. Instead, however, the integrated NOx amount NS may be obtained by the amount of the NOx flowing into the SCR catalyst 41 being estimated from the engine operation states (such as fuel injection quantity and engine rotation speed) and this estimated value being time-integrated.

Figure 6:
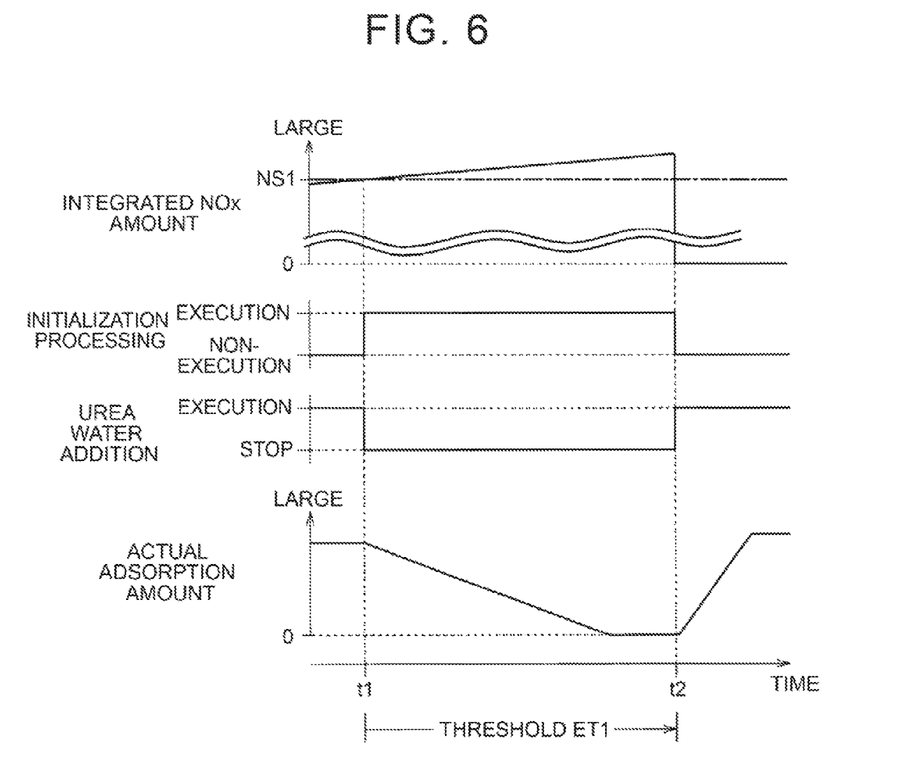
FIG. 6 is a timing chart illustrating an effect of an initialization processing according to a modification example of this embodiment.

The temperature-raising processing for raising the temperature of the exhaust gas flowing into the SCR catalyst 41 is executed as the initialization processing. Instead, however, a processing for stopping the urea water addition from the urea water supply mechanism 200 may be executed as the initialization processing as illustrated in FIG. 6. When the urea water addition is stopped as described above, the reduction processing for the NOx flowing into the SCR catalyst 41 is performed by the ammonia that was adsorbed on the SCR catalyst 41 before the urea water addition is stopped. Accordingly, the ammonia adsorbed on the SCR catalyst 41 is consumed through a reduction reaction with the NOx after time t1 as illustrated in FIG. 6, and the ammonia adsorption amount of the SCR catalyst 41 gradually decreases. Accordingly, the amount of the ammonia adsorbed on the SCR catalyst 41 can be decreased to "0" in the end.

In addition, the temperature-raising processing for raising the temperature of the exhaust gas flowing into the SCR catalyst 41 and the processing for stopping the urea water addition from the urea water supply mechanism 200 may be used in combination with each other as the initialization processing.

What is claimed is:

1. An exhaust gas control apparatus for an internal combustion engine, the exhaust gas control apparatus comprising:
   a urea water injection valve configured to add urea water to exhaust gas in an exhaust passage of the internal combustion engine;
   a catalyst disposed in the exhaust passage downstream of the urea water injection valve, the catalyst configured to (a) adsorb ammonia generated from the urea water and (b) remove NOx from the exhaust gas by using the ammonia which has been adsorbed on the catalyst; and
   an electronic control unit configured to (i) set a target adsorption amount of the ammonia adsorbed on the catalyst, (ii) control the urea water injection valve such that an amount of the urea water added to the exhaust gas becomes an addition amount calculated based on the target adsorption amount, and (iii) execute an initialization processing that decreases the amount of the ammonia adsorbed on the catalyst to zero in a case where an integrated value of an amount of the NOx flowing into the catalyst is equal to or higher than a predetermined value.

2. The exhaust gas control apparatus according to claim 1, wherein the electronic control unit executes the initialization processing by executing a temperature-raising processing that raises a temperature of the exhaust gas flowing into the catalyst.

3. The exhaust gas control apparatus according to claim 2, wherein the electronic control unit executes the temperature-raising processing by raising the temperature of the exhaust gas to a temperature at which the ammonia is desorbed from the catalyst.

4. The exhaust gas control apparatus according to claim 1, wherein the electronic control unit executes the initialization processing by stopping the adding of the urea water by the urea water injection valve.

5. The exhaust gas control apparatus according to claim 1, wherein,
the electronic control unit is configured to measure an execution time of the initialization processing, and
the electronic control unit executes the initialization processing until the measured execution time reaches a predetermined threshold.

6. The exhaust gas control apparatus according to claim 2, wherein the electronic control unit executes the initialization processing by stopping the adding of the urea water by the urea water injection valve.

7. The exhaust gas control apparatus according to claim 3, wherein the electronic control unit executes the initialization processing by stopping the adding of the urea water by the urea water injection valve.

8. The exhaust gas control apparatus according to claim 1, wherein the electronic control unit calculates the integrated value of the amount of the NOx flowing into the catalyst.

9. The exhaust gas control apparatus according to claim 8, wherein the electronic control unit calculates the integrated value of the amount of the NOx flowing into the catalyst by time-integrating an NOx detection value obtained by an NOx sensor disposed in the exhaust passage upstream of the catalyst.

* * * * *